US012540701B2

(12) United States Patent
Phillips et al.

(10) Patent No.: US 12,540,701 B2
(45) Date of Patent: Feb. 3, 2026

(54) EXPANSION JOINT WITH ARCH GEOMETRY

(71) Applicant: Garlock Sealing Technologies, LLC, Palmyra, NY (US)

(72) Inventors: Brandon T. Phillips, Palmyra, NY (US); Ming-Hang Yang, Palmyra, NY (US); Louis J. Mattina, Palmyra, NY (US); Lindsay Hornbeck, Palmyra, NY (US); Nicholas C. Wheeler, Palmyra, NY (US); Trisha Perry Sampieri, Palmyra, NY (US); Robert J. Winegar, Jr., Palmyra, NY (US); Sadou Ongoiba, Palmyra, NY (US); Michael Ryan, Palmyra, NY (US)

(73) Assignee: GARLOCK SEALING TECHNOLOGIES LLC, Palmyra, NY (US)

( * ) Notice: Subject to any disclaimer, the term of this patent is extended or adjusted under 35 U.S.C. 154(b) by 0 days.

(21) Appl. No.: 18/506,699

(22) Filed: Nov. 10, 2023

(65) Prior Publication Data

US 2024/0175532 A1 May 30, 2024

Related U.S. Application Data

(60) Provisional application No. 63/429,071, filed on Nov. 30, 2022.

(51) Int. Cl.
*F16L 51/02* (2006.01)
(52) U.S. Cl.
CPC .......... *F16L 51/022* (2013.01); *F16L 51/024* (2013.01); *F16L 51/026* (2013.01)

(58) Field of Classification Search
CPC ... F16L 27/108; F16L 27/1085; F16L 51/022; F16L 51/023; F16L 51/024; F16L 51/026; F16L 51/029
See application file for complete search history.

(56) References Cited

U.S. PATENT DOCUMENTS 2,692,782 A   10/1954   Jones
2,879,804 A   3/1959   Hammond
(Continued)

FOREIGN PATENT DOCUMENTS

CA   1052302 A1   4/1979
CN   2129861 Y   4/1993
(Continued)

OTHER PUBLICATIONS

International Search Report and Written Opinion, Issued for PCT/US2015/010659 by the International Search Authority of Korea on Apr. 16, 2015. 15 pages.

*Primary Examiner* — Zachary T Dragicevich
(74) *Attorney, Agent, or Firm* — Husch Blackwell LLP (57) ABSTRACT

An expansion joint is formed from a plurality of layers comprising a ring tie-in ply, a pair of arch rings at opposing transition points, two body plies, with inverted bias cut angles between about 48° to 60°, where about is typically plus or minus 1 degree. The arch geometry is such that the arch has an axial length C between the transition points and an inner surface arch circumference length of A between the transition points in a neutral state, such that the maximum compression distance for the expansion joint is the length C, the maximum elongation distance for the expansion joint is a length (A–C), and a maximum lateral deflection length for the expansion joint is a length Y.

20 Claims, 7 Drawing Sheets

(56) References Cited

U.S. PATENT DOCUMENTS

| | | | |
|---|---|---|---|
| 2,998,986 A | | 9/1961 | Buono |
| 3,039,795 A | | 6/1962 | Reuter |
| 3,051,512 A | | 8/1962 | Cranston |
| 3,139,115 A | | 6/1964 | Bawcon et al. |
| 3,315,704 A | | 4/1967 | Shire |
| 3,359,014 A | | 12/1967 | Clements |
| 3,363,918 A | | 1/1968 | Fisher |
| 3,429,592 A | | 2/1969 | Merkwacz |
| 3,446,248 A | | 5/1969 | Press |
| 3,550,639 A | | 12/1970 | Takeo |
| 3,580,616 A | | 5/1971 | Merkwacz |
| 3,633,945 A | | 1/1972 | Press et al. |
| 3,831,635 A | | 8/1974 | Burton |
| 4,101,150 A | | 7/1978 | Thawley et al. |
| 4,127,039 A | | 11/1978 | Hollaway, Jr. |
| 4,132,382 A | | 1/1979 | Jackson |
| 4,142,554 A | | 3/1979 | Washkewicz et al. |
| 4,186,949 A | * | 2/1980 | Bartha .................. F16L 27/108 |
| 4,241,944 A | | 12/1980 | Clark |
| 4,250,223 A | | 2/1981 | Cook |
| 4,293,152 A | * | 10/1981 | Berghofer ............. F16L 51/024 |
| 4,349,049 A | | 9/1982 | Silvey |
| 4,386,796 A | | 6/1983 | Lyall et al. |
| 4,536,018 A | | 8/1985 | Patarcity |
| 4,571,230 A | | 2/1986 | Woodland |
| 4,611,832 A | | 9/1986 | Matsuoka et al. |
| 4,657,526 A | | 4/1987 | Tangorra et al. |
| 4,887,848 A | | 12/1989 | Burba |
| 5,145,191 A | | 9/1992 | Stewart et al. |
| 5,147,695 A | | 9/1992 | Colley et al. |
| 5,174,613 A | | 12/1992 | Joug |
| 5,484,173 A | | 1/1996 | Baker |
| 5,573,284 A | | 11/1996 | Boyer et al. |
| 5,868,437 A | | 2/1999 | Teague |
| 5,992,818 A | | 11/1999 | Jones et al. |
| 6,102,361 A | | 8/2000 | Riikonen |
| 6,412,484 B1 | | 7/2002 | Izuchukwu et al. |
| 6,631,928 B1 | | 10/2003 | Sakata |
| 7,478,651 B2 | | 1/2009 | Simpson |
| 8,479,775 B2 | | 7/2013 | Swails et al. |
| 8,671,993 B2 | | 3/2014 | Yoon et al. |
| 2004/0050440 A1 | | 3/2004 | Vohrer |
| 2005/0023829 A1 | | 2/2005 | Matzen |
| 2006/0054231 A1 | | 3/2006 | Wolfram et al. |
| 2006/0276612 A1 | | 12/2006 | Shirasaka |
| 2008/0174110 A1 | | 7/2008 | Olson |
| 2010/0102551 A1 | | 4/2010 | Zeiber |
| 2012/0146324 A1 | | 6/2012 | Keyes |
| 2013/0270818 A1 | | 10/2013 | Chung |
| 2016/0146394 A1 | | 5/2016 | Richter |

FOREIGN PATENT DOCUMENTS

| | | | | |
|---|---|---|---|---|
| CN | 2173892 Y | | 8/1994 | |
| CN | 201066019 Y | | 5/2008 | |
| CN | 201858476 U | | 6/2011 | |
| CN | 202812628 U | | 3/2013 | |
| FR | 2580222 A1 | * | 10/1986 | ............ F16L 27/108 |
| WO | 03069199 A1 | | 8/2003 | |

* cited by examiner

EXPANSION JOINT WITH ARCH GEOMETRY

CROSS-REFERENCE TO RELATED PATENT APPLICATIONS

The present application claims the benefit of U.S. Provisional Patent Application Ser. No. 63/429,071, filed Nov. 30, 2022, entitled "Expansion Joint with Arch Geometry," the disclosure of which is incorporated herein by reference as if set out in full for all purposes.

The present patent application is related to U.S. Pat. No. 10,066,771, issued Sep. 4, 2018, titled Wearable Rubber Parts for Fluid Handling Services Including a Polyurethane Inner Layer, and U.S. Pat. No. 10,400,926, issued Sep. 3, 2019, titled, Wearable Rubber Parts for Fluid Handling Services Including a Polyurethane Inner Layer, the disclosures of which are incorporated herein as if set out in full for all purposes.

BACKGROUND

The technology of the present application relates to expansion joints for fluid systems and, more specifically, expansion joints with a configured arch geometry for improved performance.

Fluid systems generally use expansion joints in rigid piping systems. The expansion joint allows for misalignment between piping segments. The expansion joint also compensates for axial, lateral, rotational, torsional, and/or angular movement. The piping system may experience misalignment and/or other movement due to system operation, vibration, thermal expansion and contraction, mechanical effects, system settlement, pressure surges and changes, reduces galvanic corrosion between dissimilar metals, and the like.

Conventionally, expansion joints should have a low spring rate, a high burst pressure, have vacuum operation, wear resistance, and the like. Expansion joints also need to provide movement. Under compression, the expansion joint must compress. Under tension, the expansion joint must elongate, and under misalignment or system stresses, the expansion joint must move laterally.

Expansion joints presently available struggle to accommodate all the requirements and variables.

Thus, against this background, it would be desirable to provide an improved expansion joint that satisfies compression, elongation, lateral movement requirements while providing low spring rates, high burst resistance, and high vacuum operation.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, an expansion joint is provided. The expansion joint comprises a first flange portion on an upstream side of the expansion joint, an upstream transition portion located downstream from the first flange, an arch located downstream of the upstream transition portion, a downstream transition portion located downstream from the arch; and a second flange portion on a downstream side of the expansion joint. The expansion joint is formed from a plurality of layers comprising a ring tie-in ply, a pair of arch rings at opposing transition points, at least one body ply, a first ply, wherein the first ply has an edge that forms an angle of less than 90° with a longitudinal axis, and a second ply, wherein the second play has an edge that forms an angle of less than 90° with the longitudinal axis. The arch geometry is such that the arch has an axial length C between the transition points and an inner surface arch circumference length of A between the transition points, such that the maximum compression distance for the expansion joint is the length C, the maximum elongation distance for the expansion joint is a length (A-C), and a maximum lateral deflection length for the expansion joint is a length Y.

These and other aspects of the present system and method will be apparent after consideration of the Detailed Description and Figures herein.

BRIEF DESCRIPTION OF DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to expansion joints connecting piping segments in a fluid system. However, the technology described herein may be used with applications other than those specifically described herein. For example, the technology of the present application may be applicable to rubber/fabric lengths having an arch including, for example, pinch valves, hoses, instrumentation connection, or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
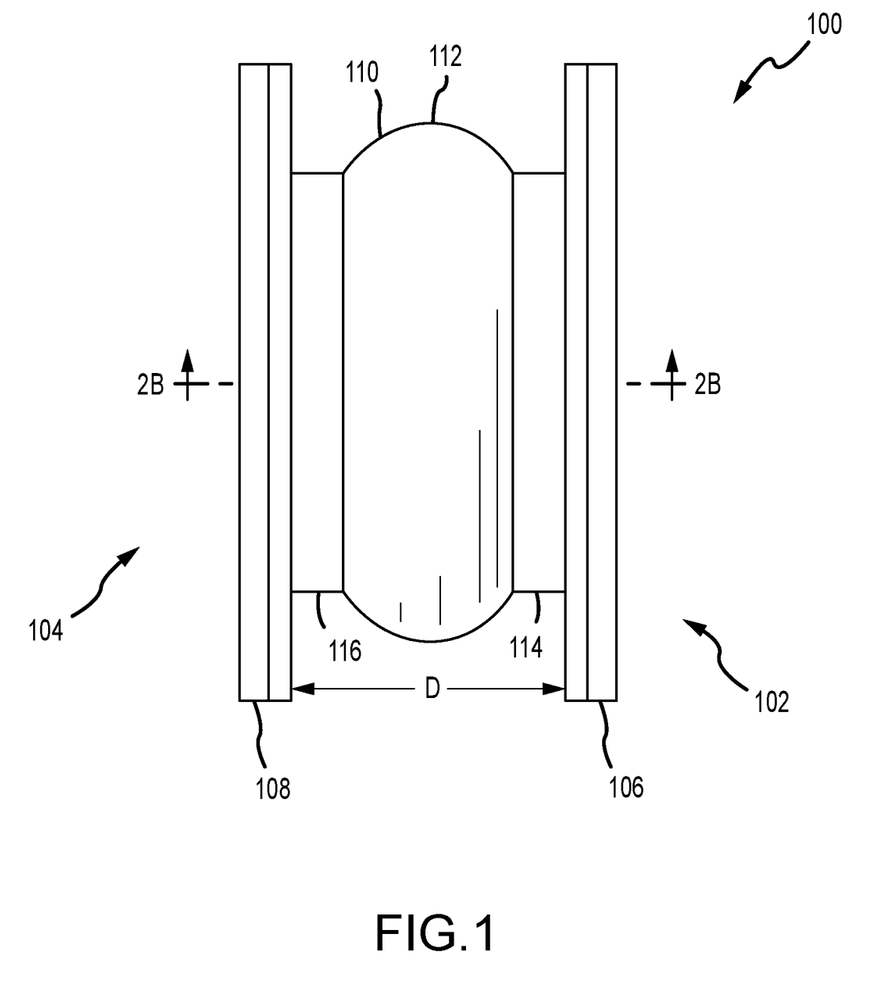
FIG. 1 is a view of an expansion joint consistent with the technology of the present application.

With reference now to FIG. 1, a view of an expansion joint 100 is shown. A partial cross-sectional view of expansion joint 100 across line 2B is shown in FIG. 2B. For illustrative purposes, the expansion joint 100 may have an upstream side 102 and a downstream side 104 opposite the upstream side 102, but for all intents and purposes, the upstream side 102 and the downstream side 104 are reversible. The expansion joint 100 includes a first flange 106 on the upstream side 102 and a second flange 108 on the downstream side 104. The expansion joint 100 has an arch 110, which will be explained further below, located between the first flange 106 and the second flange 108, typically an apex 112 of the arch 110 of the expansion joint 100 is located ½ the distance D between the first flange 106 and the second flange 108, although the arch 110 and the apex 112 can be in alternative locations. The expansion joint 100 has an upstream transitional portion 114 between the first flange 106 and the arch 110 and a downstream transitional portion 116 between the second flange 108 and the arch 110.

Figure 2A:
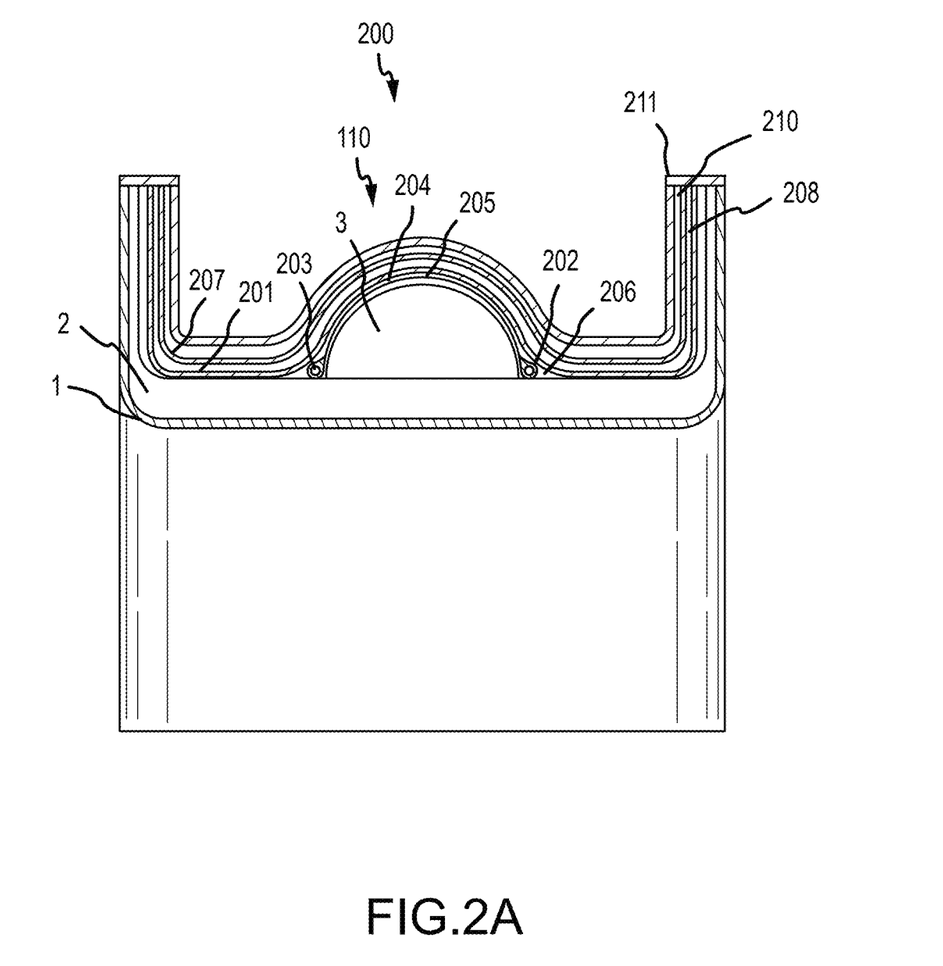
FIG. 2A is a cross sectional view of the expansion joint of FIG. 1 being made consistent with the technology of the present application.
Figure 2B:
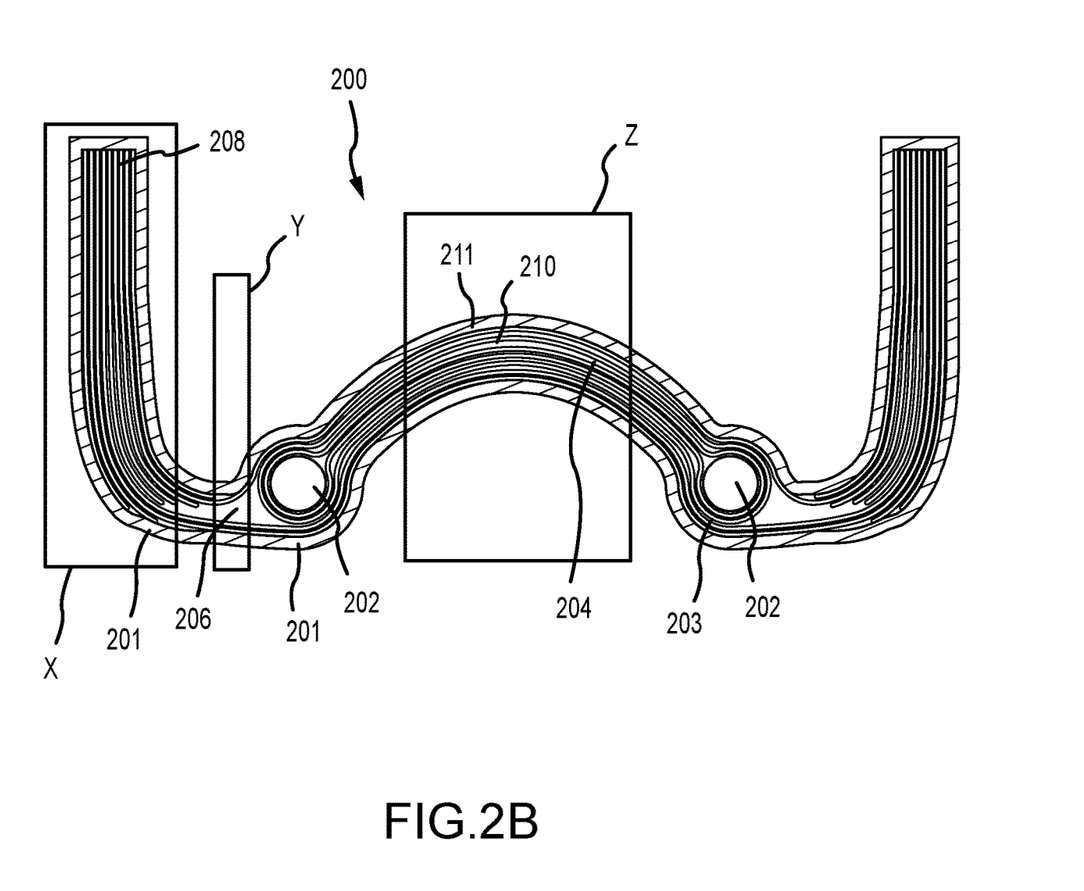
FIG. 2B is a cross sectional view of the expansion joint of FIG. 1.

FIG. 2A shows a partial cross-sectional view of the expansion joint 100. As can be appreciated, the FIG. 2A shows the expansion joint 100 during the build of the expansion joint 100. The cross section shown in FIG. 2A contains parts to facilitate the molding or formation of the expansion joint 100, such as a first mandrel 1, that is approximately the diameter of the piping for the fluid system in this exemplary embodiment, a second mandrel 2, and an arch inserts 3. The expansion joint 100 comprises a number of layers, which will be explained herein with respect to FIG. 2A and FIG. 2B. Certain of the layers 200 of the expansion joint 100 extend from the first flange 106 to the second flange 108 as will be clear with reference to FIGS. 2A and 2B.

The expansion joint is generally formed from a number of layers 200. Some of the layers 200 extend from the first flange 106 to the second flange 108 and include, a rubber layer 201 located on the inner diameter of the expansion joint 100, at least two (2) body ply layers 207, located on the rubber layer 201, and a cover layer 210 located on the outer diameter of the expansion joint 100. Other layers 200 include ring tie-in ply 204, a flange filler 208 and a ring filler 206 as will be explained further below. These additional layers generally are located in a flange section (box X in FIG. 2B), a transition section (Box Y in FIG. 2B), and an arch section (Box Z in FIG. 2B) In one example, the body ply layers may be a thermoplastic type polymer, such as, for example a polyamide fiber sheet like nylon. The nylon sheet may be reinforced with fibers, such as aramid and rayon fibers, which is generally referred to herein as a nylon tire cord material. In certain embodiments, the nylon sheet may have a bias cut between about 48° and 60°, and in still other embodiments, the bias cut is about 54°. Changing the bias cut angle provided hereto for unrecognized benefits to the strength of the material as to burst strength. The rubber layer 201 may be a natural or synthetic rubber or rubber composite. The specific composition of the rubber layer 201 is chosen based on the intended fluid media to be transported through the expansion joint. The cover layer 210 is generally a fabric with a rubber composite skived onto the outer surface of the fabric. The rubber may be considered a separate rubber layer 211. The cover layer 210 is a finishing layer, and may be chosen based on external environmental conditions or other factors.

As shown in FIGS. 2A and 2B, the expansion joint 100 has a pair of arch rings 202 located at a transition points 203. The transition points 203 are located at an inner diameter ID of the expansion joint at the transitions from the upstream transitional portion 114 and the arch 110 and the downstream transitional portion 116 and the arch 110, although only the downstream transition point 203 is labeled. The arch rings 202 are encompassed by a ring tie-in ply 204 (see FIG. 3) that extends along arch 110. The ring tie-in ply 204 is placed radially outward on the body ply layers 207. In one example, the ring tie-in ply may be a thermoplastic type polymer, such as, for example a polyamide fiber sheet like nylon. The nylon sheet may be reinforced with fibers, such as aramid and rayon fibers, which is generally referred to herein as a nylon tire cord material. In certain embodiments, the nylon sheet may have a bias cut between about 48° and 60°, and in still other embodiments, the bias cut is about 54°. Changing the bias cut angle provided hereto for unrecognized benefits to the strength of the material as to burst strength. The cover ply 210 is placed outward from the ring tie-in ply 204 and ring filler 206. Encompassing the area at the transition points 203 about the arch rings 202, which are typically steel or another compatible metal, is a ring filler 206. The ring filler may be a natural or synthetic rubber material generally having a good flow properties and low porosity to inhibit formation of voids or air pockets.

Figure 3:
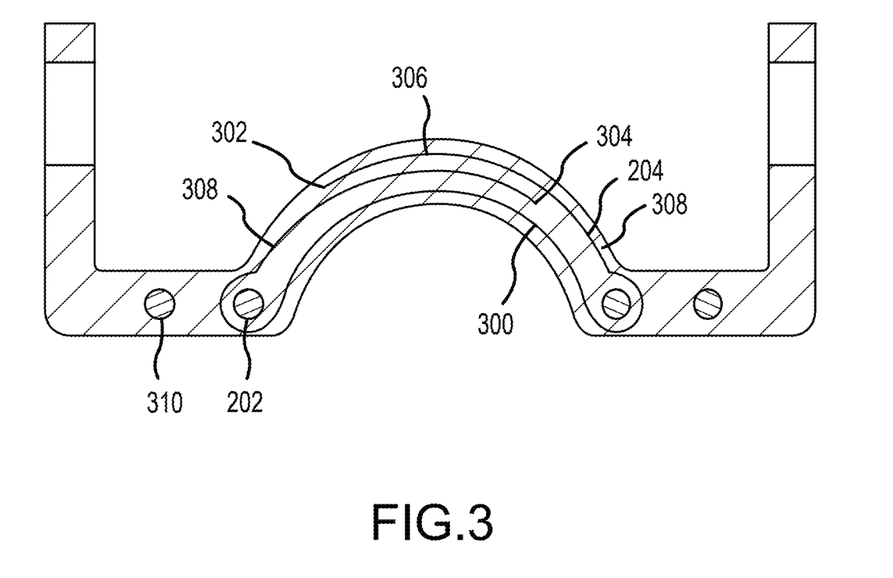
FIG. 3 is a conceptual cross section of the expansion joint of FIG. 1 detailing the ring tie-in ply and arch rings.

FIG. 3 shows an image of the expansion joint 100 with a detail of the arch rings 202 and the ring tie-in ply 204, for exemplary purposes. The ring tie-in ply 204 is a single sheet of material 300 with a first end 302 and a second end 304 opposite the first end 302. The sheet of material 300 is placed over the body ply layers 207 and the arch insert 3. The arch rings 202 are placed on opposing sides of the arch 110 at the transition points 203 over the sheet of material 300. The second end 304 of the ring tie-in ply is folded over one of the arch rings 202 and placed onto the sheet of material. The first end 302 of the ring tie-in ply is folded over the other of the arch rings 202 and placed onto the sheet of material such that the sheet of material overlaps on itself with 3 layers (3 layer overlap 306) when the ends overlap and 2 layers (2 layer overlap 308) elsewhere. The overlap portion should be a minimum of about 0.5 inches across the center of the arch in either direction for a total circumferential length of about 1 inch, although as little as about 0.5 inches is possible in some embodiments (0.5 inches about the center would entail about 0.25 inches along the circumference of the arch in both the upstream and downstream direction) and a maximum overlap of the entire arch length, but an overlap of about 1 inch overlap on the arch is generally a functionally stable overlap. The overlap provides a proper bond area for the plys. at about 1 inch to 3 inches of the length of the outer surface of the arch 110. The arch rings 202, among other things, help hold the arch 110 in place during manufacturing. Additionally, the arch rings 202 inhibit the arch from collapsing during a suction event or high vacuum event. Moreover, the arch rings 202 inhibit the arch from expanding or fatiguing under system pressures or overpresurization.

FIG. 3 also shows body rings 310. The body rings 310 may be rings of metal, such as steel, similar to the arch rings 202. Generally the body rings 310 provide additional strength for the expansion joint for burst pressure rating, vacuum rating, and flange strength for bolting and sealing surface strength. Rather than rings the body rings 310 may be elongated to form rods or sheets of metal. The body rings 310 are not included in certain embodiments of the technology.

The body plies 207 generally are formed from a nylon tire cord material as outlined above. The expansion joint 100 may have from 2 to 8 body ply 207 layers, but less than 2 and more than 8 body ply layers 207 are possible depending on the implementation of the expansion joint 100 including such factors as the size (i.e., diameter), operating pressure, media, and other ratings of the expansion joint 100. The first flange 106 and the second flange 108 are typically designed with a particular thickness to ensure features, such as bolt strength and fittings. A flange filler 208 is placed outwardly of the body plies 207. As can be best seen in FIG. 2B and specifically Box X, the flange filler 208 is arranged over the body plies 207 located in the first flange 106 and the second flange 108 (although only second flange 108 is shown in FIG. 2B). The flange filler 208 is a fabric filler (as opposed to the rubber filler of the ring filler 206). The fabric is generally a woven fabric formed from cotton, polyester, nylon, or aramid, or the like. The fabric provides high dimensional stability and low flow/creep. The flange filler 208 includes an elastomer skived on or otherwise applied to the fabric, which provides a bonding or adhesive effect. The flange filler 208 may be layered and in certain embodiments is at least 0.5 inches thick to provide sufficient flange thickness to allow bolting the expansion joint to the pipe system.

Still with reference to FIGS. 2A and 2B, generally the interior diameter of the expansion joint 100 is formed by a rubber layer 201 and at least two (2) body plies 207 where the body plies are formed of the nylon tire cord material explained further above. Additionally, as with the material of the ring tie-in play 204, the ply is formed with a bias cut of approximately 54° (or another angle bias cut between about 48° and 60°). The flange filler 208 is built up on the body plies to provide a thickness for the first flange 106 and the second flange 108. Typically, the flange filler 208 provides a thickness of about 0.040 to 0.050 inches, which a thickness of 0.045 inches providing a good thickness for bonding and adhesion. The rubber component may be skived or skimmed on the fabric of the flange filler 208. The technology herein generally provides two (2) body ply layers 207 that are wrapped on the structure.

Figure 4:
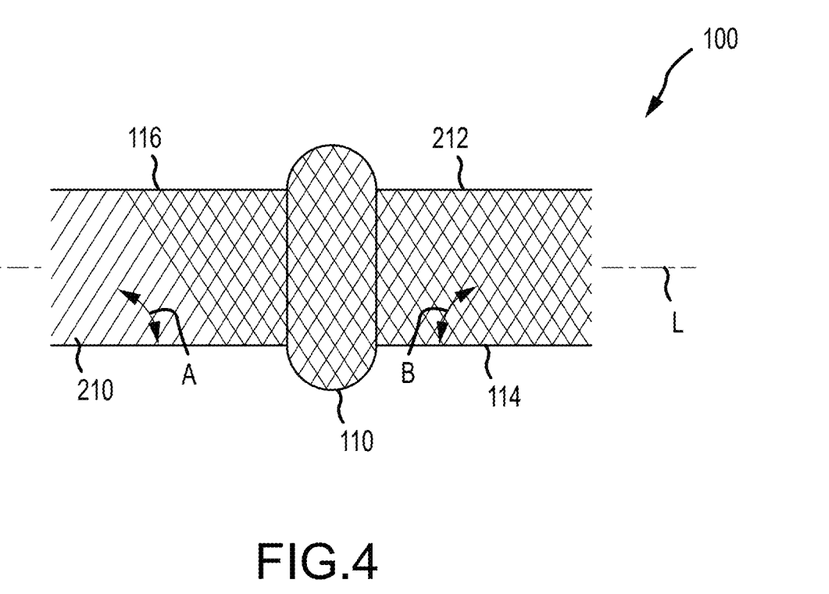
FIG. 4 is a partial view of the expansion joint of FIG. 1 consistent with the technology of the present application.

With reference to FIG. 4, a partial side elevation view of the expansion joint 100 is shown. FIG. 4 shows the upstream transition portion 114, the arch 110, and the downstream transition portion 116. The second of the two (2) body ply layers (designated 2nd ply 212 in the FIG. 4 for reference) is shown but partially removed to expose the first of the two (2) body ply layers (designated 1st ply layer 210 in FIG. 4 for reference). The 1st ply layer 210 is formed by wrapping the 1st ply layer about the sections of the expansion joint 100. The 1st ply 210 has an edge that forms an angle A with a longitudinal axis L of the expansion joint 100. The angle A is shown as a 54° angle, but the angle could be between about 48° and about 60°. As can be appreciated, the 2nd ply layer 212 is formed by wrapping the 2nd ply layer 212 around the 1st ply layer 210. The 2nd ply layer 212 also has a leading edge that forms an angle B, which is shown as the same or similar to angle A. The 2nd ply layer 212 is wrapped in manner inverted from the 1st ply layer 210. Similarly, the ring tie-in ply 2104 has a bias cut between about 48° and about 60°, and is shown at 54°, and may have alternating directions of the cut also.

The one or more body rings 310 shown in FIG. 3 are generally placed after the body ply 207 is layered onto the structure that will be formed into the expansion joint 100. The flange filler 208 is placed onto the body ply 207 in the first flange 106 and the second flange 108 area. The cover layer 210 then covers the flange filler 208 and the body rings 310.

The expansion joints 100 need to meet certain design characteristics including low spring rates, high burst pressure resistance, and low vacuum operation along with minimum compression, elongation, and lateral movement requirements (generically "movement requirements"). To meet the minimum movement requirements, the expansion joints are formed with specific design to meet the movement requirements.

Figure 5:
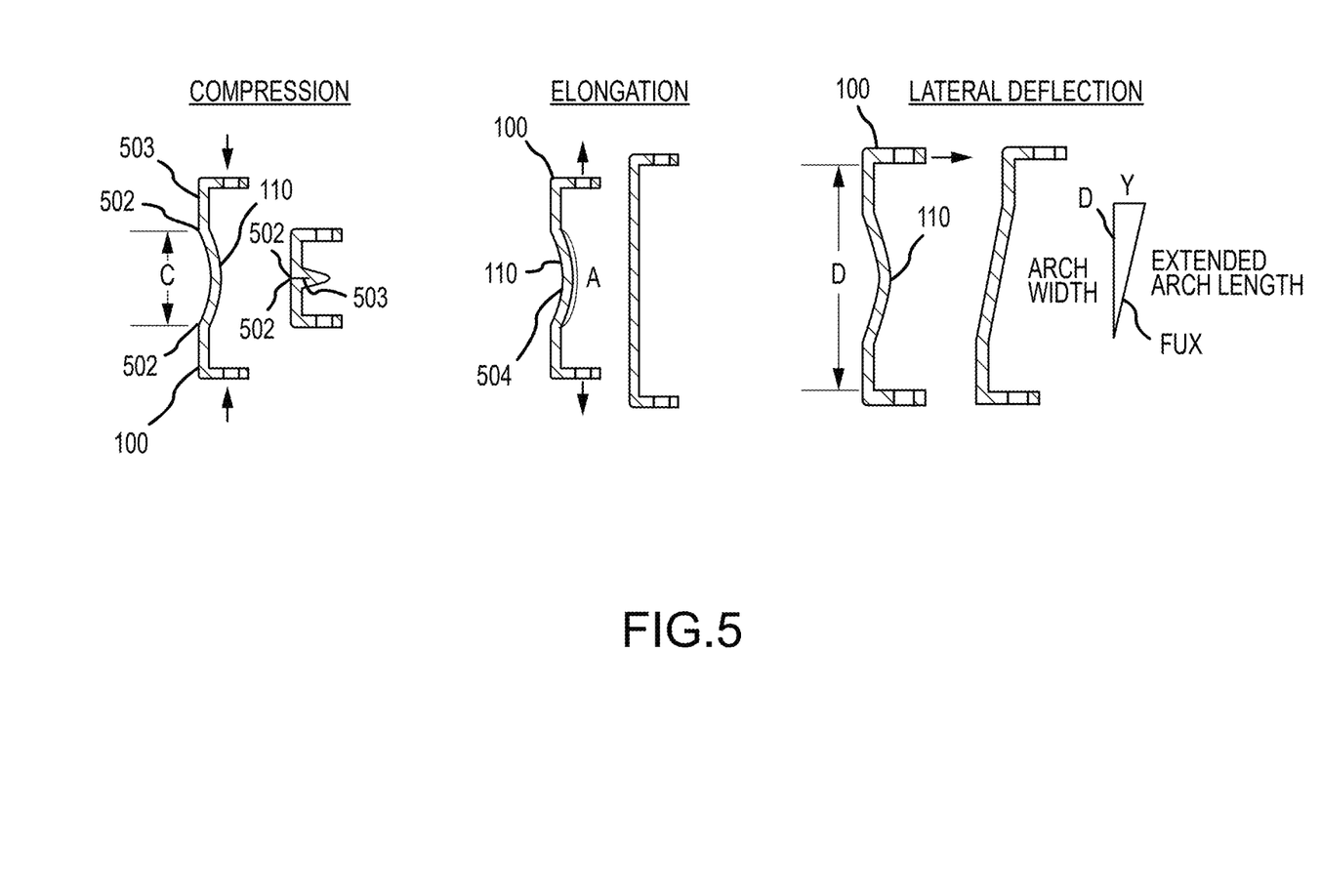
FIG. 5 is a figure showing design characteristics of the expansion joint of FIG. 1 consistent with the technology of the present application.

FIG. 5 shows a partial cross-sectional view of the expansion joint 100. The arch 110 is shown in a neutral state. The expansion joint 100 in the neutral statement means the expansion joint 100 is shown neither in compression, elongation, nor lateral deflection (although the 3 views provided also show full compression, full elongation, and full deflection). The arch 110 has a maximum compression distance C, which is defined as the Chord length at the tube side. The distance C is the distance between the transition points 502 on the inner surface 503 of the expansion joint 100. Essentially, the compression distance is limited by the movement in the axial direction of the arch 110 until it no longer compresses because the transition points 502 (or the inner surface 503 along the arch 110) abut inhibiting further compression.

The distance A is the distance between the transition points 502 on the inner surface 504 along the arch, which may also be called the inner arch circumference (as opposed to an outer arch circumference or a medial arch circumference). The maximum elongation of the expansion joint 100 is the difference between the arch length A and the chord length C, and is limited by the fullest extension of the arch.

The design of the arch 110 inner surface distance A and the axial distance C combine to determine the maximum lateral deflection. The lateral deflection Y which is the solvable by the right angle triangle comprising the known distance D between the flange surfaces (see FIG. 1) in the neutral state (also know as the face to face distance) and the fully extended joint length (FUX). The fully extended joint length is the distance D plus the distance A. Given D and FUX, the right triangle equation is $(FUX)^2-(D)^2=(Y)^2$ where Y is the maximum lateral deflection, which will typically be reduced by a safety factor, which may be dependent on the system design but is 2 plus or minus 0.2 in the present exemplary embodiment.

Figure 6:
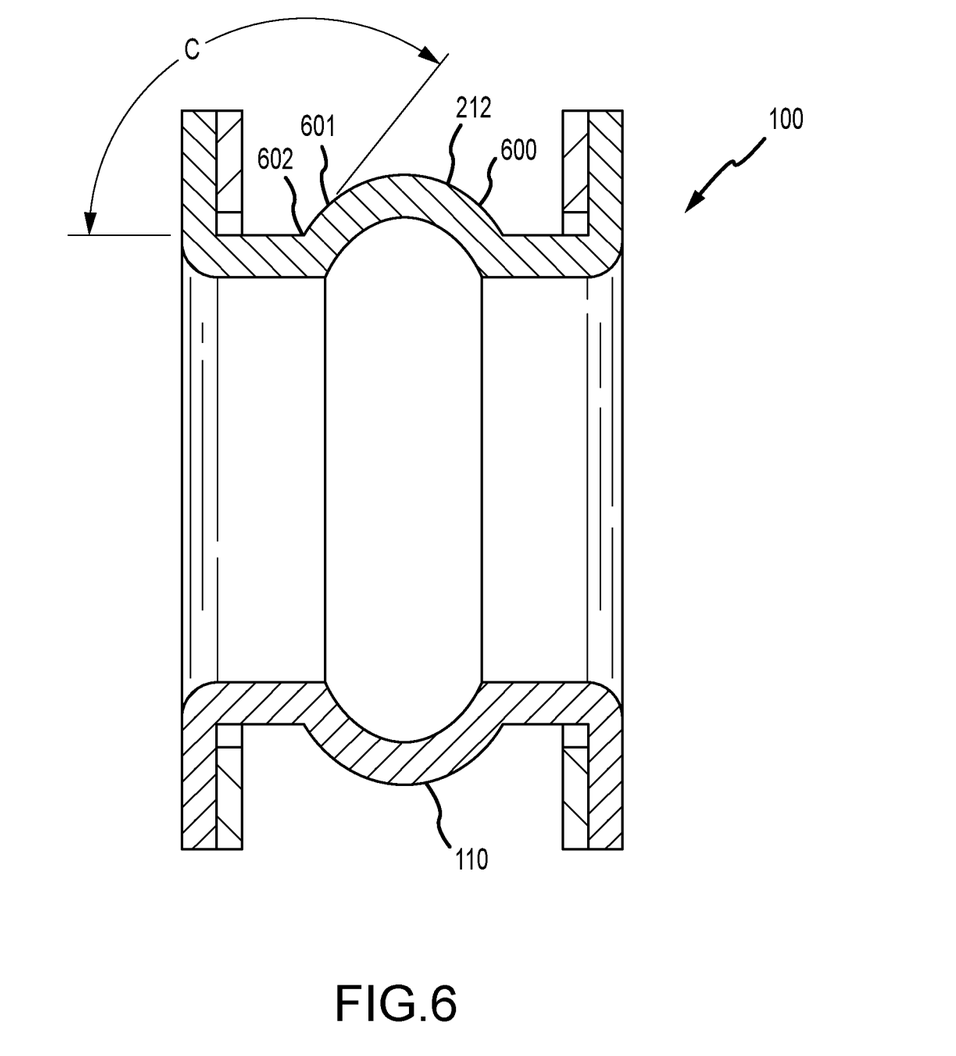
FIG. 6 is another cross section of the expansion joint of FIG. 1 consistent with the technology of the present application.

FIG. 6 shows another cross section of the expansion joint 100. Unlike FIG. 2, FIG. 6 shows the expansion joint 100 after it has been manufactured, such that the mandrel and the arch insert are removed. For the arch 110 as shown, the outer surface 600 of the 2nd ply layer 212 of the expansion joint 100 has a transition point 602 between the upstream transitional portion 114 and downstream transitional portion 116, and the arch 110. An angle C is formed between the lateral portion of the outer surface 600 and the tangent of the outer surface 601 of the arch 110. The angle C in this embodiment is about 128.4°, and is generally between about 100° and 150°. The present design supports angle C to be between about 95° and 160°, but at the low arch angle of 160° the expansion joint will have a low elongation and at a high arch angle of 95° the design inhibits operation of bolting the flanges.

Figure 7:
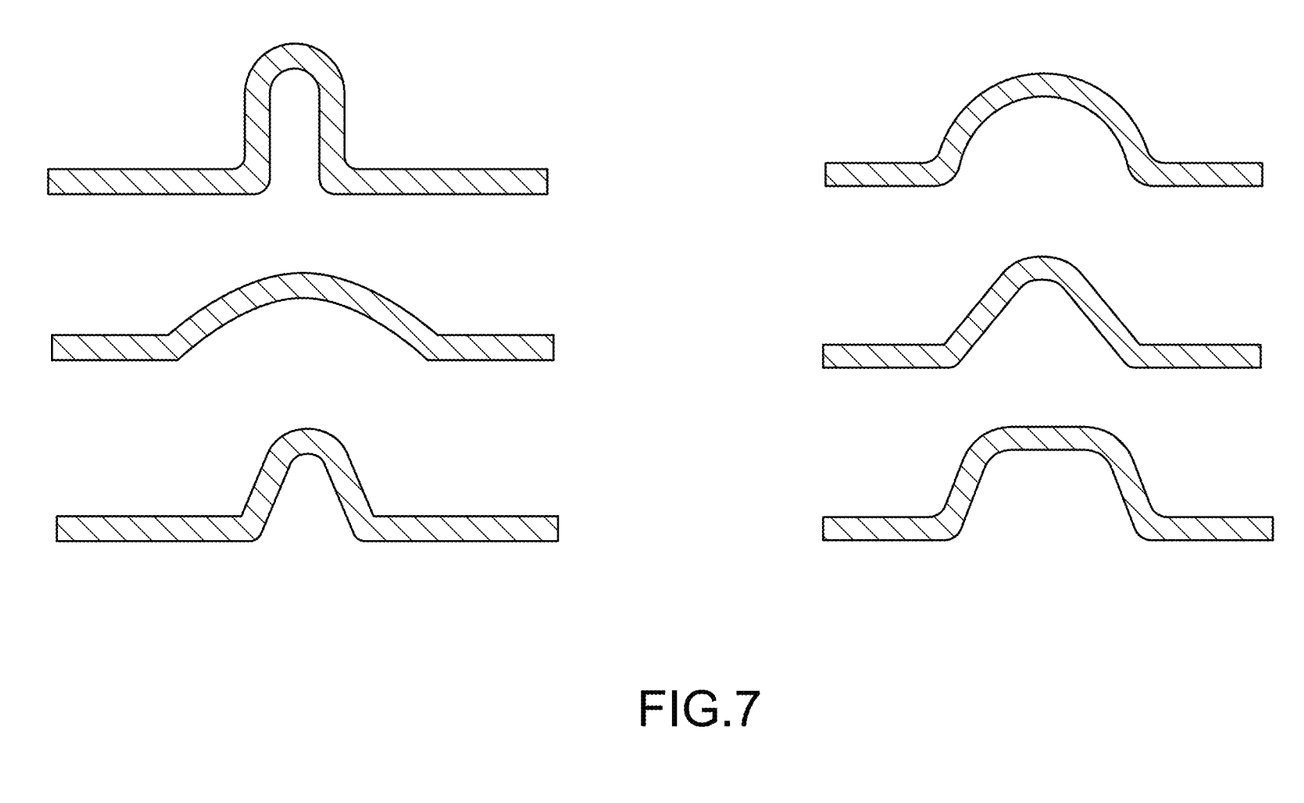
FIG. 7 is a view of arch designs for which the technology of the present application is applicable.

The expansion joint 100, as generally shown herein, is considered a flowing arch expansion joint. As shown by FIG. 7, the technology of the present application may be incorporated into numerous arch styles that may be incorporated into expansion joints including, for example, abrupt arch expansion joints. The dimensions shown in FIG. 7 are exemplary only and not limiting. Of course, other types of joints and uses are possible for the technology herein. The difference between a flowing arch expansion joint and an abrupt arch expansion joint is generally the shape of the arch. A flowing arch expansion joint has a gradual arch over an extended (often a majority) axial length of the expansion joint whereas an abrupt arch expansion joint is a short arch extending over a minority axial length of the expansion joint.

The expansion joint 100 has an arch 110 that has a distance C, an arc length A, and a lateral deflection Y to optimize the compression, elongation and lateral deflection movements. These design rules along with the nylon tire cord material, with a strength of 70 to 75 lbs and a count/inch of about 20-25, identified above to provide strength, and the bias cut angles. Generally, the ply layers have matching bias cut angles, such as the aforementioned 54°, but alternating direction for the even and odd layers. In other words, layers 1, 3, 5, . . . have a first direction and layers 2, 4, 6, . . . have a second direction. Additionally, the design rules, tire cord material, and bias cut angles also provide for low spring rates and high burst pressures.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An expansion joint with an arch geometry comprising,
a first flange portion on an upstream side of the expansion joint;
an upstream transition portion located downstream from the first flange;
an arch located downstream of the upstream transition portion;
a downstream transition portion located downstream from the arch; and
a second flange portion on a downstream side of the expansion joint, wherein
the expansion joint is formed from a plurality of layers comprising:
a ring tie-in ply;
a pair of arch rings at opposing transition points;
at least one body ply, wherein the at least one body ply comprises;
a first ply, wherein the first ply has an edge that forms an angle with a longitudinal axis;
a second ply, wherein the second play has an edge that forms the angle with the longitudinal axis, wherein
the first ply is wrapped and the second ply is wrapped inverted to the first ply, and the angle with the longitudinal axis is 48 to 60°; and
the arch has an axial length C between the transition points and an inner surface arch circumference length of A between the transition points, such that the maximum compression distance for the expansion joint is the length C, the maximum elongation distance for the expansion joint is a length (A−C), and a maximum lateral deflection length for the expansion joint is a length Y.

2. The expansion joint of claim 1 wherein the ring tie-in ply is a continuous ply that wraps around arch rings and having first and second ends that overlap to form a 3-layer overlap about a center of the arch and a 2-layer overlap at edges of the arch.

3. The expansion joint of claim 1 wherein a ring filler is between the ring tie-in ply and the at least one body ply.

4. The expansion joint of claim 3 wherein a flange filler is between the at least one body ply and the first ply.

5. The expansion joint of claim 4 wherein the second ply comprises a rubber pressed into the fabric of the ply.

6. The expansion joint of claim 4 wherein the flange filler comprises a fabric filler.

7. The expansion joint of claim 6 wherein the fabric filler includes a woven fabric with an elastomer applied to the fabric.

8. The expansion joint of claim 7 wherein the woven fabric comprises a fabric selected from the group of fabrics consisting of cotton, polyester, nylon, or aramid.

9. The expansion joint of claim 4 wherein the flange filler is no more than 0.05 inches thick.

10. The expansion joint of claim 4 wherein the flange filler is no less than 0.04 inches thick.

11. The expansion joint of claim 3 wherein the ring filler is a rubber selected from the group of rubbers consisting of: natural rubber material or synthetic rubber material.

12. The expansion joint of claim 1 wherein the angle is 54°.

13. A fluid system having a plurality of pipes to transport a fluid media, wherein the plurality of pipes have at least a first pipe with a first pipe flange and a second pipe with a second pipe flange, the fluid system comprising:
an expansion joint coupling the first pipe flange and the second pipe flange, wherein the expansion joint comprises:
a first flange portion on an upstream side of the expansion joint;
an upstream transition portion located downstream from the first flange;
an arch located downstream of the upstream transition portion;

a downstream transition portion located downstream from the arch; and a second flange portion on a downstream side of the expansion joint, wherein the expansion joint is formed from a plurality of layers comprising:

a pair of arch rings at opposing transition points;

a continuous ring tie-in ply, wherein the ring tie-in ply has a first end and a second end and the second end is folded over one of the pair of arch rings and the first end is folded over the other of the pair of arch rings such that the first end overlaps the second end to form a 3-layer overlap portion;

at least one body ply, wherein the at least one body ply comprises;

a first ply, wherein the first ply has an edge that forms an angle between 48° and 60° with a longitudinal axis; and a second ply, wherein the second play is inverted to the first ply and has an edge that forms an angle between 48° and 60° with the longitudinal axis.

14. The fluid system of claim 13, wherein the arch has an axial length C between the transition points and an inner surface arch circumference length of A between the transition points, such that the maximum compression distance for the expansion joint is the length C, the maximum elongation distance of the expansion joint is a length (A-C), and a maximum lateral deflection length for the expansion joint is a length Y based on the length C and the length (A–C).

15. The fluid system of claim 13, wherein the 3-layer overlap portion has a circumferential length of at least 0.5 inches.

16. The fluid system of claim 15, wherein the 3-layer overlap portion has a circumferential length of 1 to 3 inches.

17. The fluid system of claim 13, wherein the 3-layer overlap portion extends from one of the pair of arch rings to another of the pair of arch rings.

18. The fluid system of claim 13 wherein the angle is 54°.

19. An expansion joint with an arch geometry comprising, a first flange portion on an upstream side of the expansion joint;

an upstream transition portion located downstream from the first flange;

an arch located downstream of the upstream transition portion;

a downstream transition portion located downstream from the arch; and a second flange portion on a downstream side of the expansion joint, wherein the expansion joint is formed from a plurality of layers comprising:

a pair of arch rings at opposing transition points;

a single ring tie-in ply, wherein the ring tie-in ply has a first end and a second end and the second end is folded over one of the pair of arch rings and the first end is folded over the other of the pair of arch rings such that the first end overlaps the second end to form a 3-layer overlap portion at least one body ply, wherein the at least one body ply comprises;

a first ply, wherein the first ply has an edge that forms an angle of between 48° and 60° with a longitudinal axis; and a second ply, wherein the second play has an edge that forms an angle of between 48° and 60° with the longitudinal axis.

20. The expansion joint of claim 19 wherein the angle is 54°.

* * * * *